(12) United States Patent
Ryu et al.

(10) Patent No.: US 9,971,046 B2
(45) Date of Patent: May 15, 2018

(54) RADIATION IMAGING APPARATUS AND RADIATION IMAGING SYSTEM

(71) Applicant: CANON KABUSHIKI KAISHA, Tokyo (JP)

(72) Inventors: Takuya Ryu, Kokubunji (JP); Toshio Kameshima, Kumagaya (JP); Tomoyuki Yagi, Honjo (JP); Katsuro Takenaka, Honjo (JP); Atsushi Iwashita, Saitama (JP); Eriko Sato, Tokyo (JP); Hideyuki Okada, Honjo (JP); Kosuke Terui, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/969,089

(22) Filed: Dec. 15, 2015

(65) Prior Publication Data

US 2016/0178764 A1 Jun. 23, 2016

(30) Foreign Application Priority Data

Dec. 22, 2014 (JP) ................................ 2014-259269

(51) Int. Cl.
*G01T 1/24* (2006.01)
*H04N 5/32* (2006.01)

(52) U.S. Cl.
CPC .............. *G01T 1/247* (2013.01); *H04N 5/32* (2013.01)

(58) Field of Classification Search
CPC ........... G01T 1/24; G01T 1/2928; H04N 5/32; H01L 27/14676; G03B 42/04
See application file for complete search history.

(56) References Cited

U.S. PATENT DOCUMENTS

| | | | |
|---|---|---|---|
| 6,497,511 B1 * | 12/2002 | Schmitt .................. | H04N 5/325 348/E5.081 |
| 6,952,015 B2 | 10/2005 | Kameshima ............. | 250/370.11 |
| 7,042,979 B2 | 5/2006 | Ikeda ........................... | 378/98.8 |
| 7,227,926 B2 | 6/2007 | Kameshima et al. ........ | 378/98.9 |
| 7,342,221 B2 | 3/2008 | Takenaka et al. ......... | 250/252.1 |
| 7,532,706 B2 | 5/2009 | Kameshima et al. .......... | 378/98 |
| 7,724,874 B2 | 5/2010 | Kameshima et al. ..... | 378/98.12 |
| 7,732,778 B2 | 6/2010 | Yokoyama et al. ..... | 250/370.08 |

(Continued)

FOREIGN PATENT DOCUMENTS

| | | |
|---|---|---|
| JP | H07-250283 | 9/1995 |
| JP | 2003-190126 | 7/2003 |

*Primary Examiner* — David Porta
*Assistant Examiner* — Mamadou Faye
(74) *Attorney, Agent, or Firm* — Fitzpatrick Cella Harper and Scinto (57) ABSTRACT

A radiation imaging system for performing a plurality of times of radiation imaging is provided. A readout circuit generates a value corresponding to a signal read out from each pixel. A control unit causes the readout circuit to generate a first pixel value corresponding to a signal read out from each pixel, and a first offset value of the readout circuit before starting the plurality of times of radiation imaging. The control unit causes the readout circuit to generate a second pixel value corresponding to a signal read out from each pixel, and a second offset value of the readout circuit during a plurality of times of radiation imaging. A correction unit corrects the second pixel value by using the first pixel value, the first offset value, and the second offset value.

13 Claims, 6 Drawing Sheets

(56) References Cited

U.S. PATENT DOCUMENTS

| | | | |
|---|---|---|---|
| 7,869,568 B2 | 1/2011 | Yokoyama et al. | 378/98.8 |
| 8,072,514 B2 | 12/2011 | Takenaka et al. | 348/246 |
| 8,167,486 B2 | 5/2012 | Takenaka et al. | 378/207 |
| 8,829,438 B2 | 9/2014 | Sato et al. | 250/336.1 |
| 9,048,154 B2 | 6/2015 | Takenaka et al. | H01L 27/14612 |
| 9,134,432 B2 | 9/2015 | Iwashita et al. | G01T 1/16 |
| 2009/0001276 A1* | 1/2009 | Yagi | A61B 6/032 250/370.09 |
| 2011/0317054 A1 | 12/2011 | Kameshima et al. | 348/302 |
| 2012/0138811 A1* | 6/2012 | Takenaka | G01T 1/17 250/394 |
| 2014/0239186 A1 | 8/2014 | Sato et al. | G01T 1/17 |
| 2014/0361189 A1 | 12/2014 | Kameshima et al. | G01T 1/2928 |
| 2015/0293238 A1 | 10/2015 | Iwashita et al. | G01T 1/24 |
| 2016/0021290 A1 | 1/2016 | Yagi et al. | 250/394 |

\* cited by examiner

RADIATION IMAGING APPARATUS AND RADIATION IMAGING SYSTEM

BACKGROUND OF THE INVENTION

Field of the Invention

The present invention relates to a radiation imaging apparatus and a radiation imaging system.

Description of the Related Art

There is known a radiation imaging apparatus that performs static image capturing such as radiography, and moving image capturing such as fluoroscopy. An image generated by the radiation imaging apparatus contains fixed pattern noise (to be referred to as FPN hereinafter) arising from variations of the capacity at the time of manufacturing and variations of the offset of a readout circuit. The FPN is removed from a radiation image by subtracting an FPN image generated by performing readout from pixels in a state in which they are not exposed to radiation, from a radiation image generated by performing readout from pixels in a state in which they are exposed to radiation. This method is called FPN correction. In Japanese Patent Laid-Open No. 7-250283, a radiation image and an FPN image are generated for every frame of fluoroscopy, and FPN correction is performed. However, it is difficult to increase the frame rate by this method because an FPN image is generated for every frame. In Japanese Patent Laid-Open No. 2003-190126, therefore, an FPN image is generated before the start of fluoroscopy, and FPN correction of a radiation image of each frame is performed using the FPN image generated in advance.

SUMMARY OF THE INVENTION

The present inventors have found that, when FPN correction is performed using an FPN image generated in advance, FPN cannot be satisfactorily removed from a radiation image and a streaked artifact sometimes appears in the radiation image. This is conceivable because, when the temperature in the radiation imaging apparatus is different between the time of generating an FPN image and the time of generating a radiation image, FPN contained in the radiation image differs from FPN contained in the FPN image. One aspect of the present invention provides a technique for performing FPN correction of a radiation image with high accuracy using an FPN image generated before a plurality of times of radiation imaging such as fluoroscopy.

An aspect of the present invention provides a radiation imaging system for performing a plurality of times of radiation imaging, the system comprising: a plurality of pixels configured to generate a signal corresponding to a radiation dose; a signal line connected to the plurality of pixels; a readout circuit configured to read out a signal from each pixel through the signal line, and generate a value corresponding to the signal; a control unit configured to control an operation of the readout circuit; and a correction unit configured to correct the value generated by the readout circuit, wherein the control unit causes the readout circuit to generate a first pixel value corresponding to a signal read out from each pixel, and a first offset value of the readout circuit before starting the plurality of times of radiation imaging, the control unit causes the readout circuit to generate a second pixel value corresponding to a signal read out from each pixel, and a second offset value of the readout circuit during the plurality of times of radiation imaging, and the correction unit corrects the second pixel value by using the first pixel value, the first offset value, and the second offset value.

Another aspect of the present invention provides a radiation imaging apparatus included in a radiation imaging system for performing a plurality of times of radiation imaging, the apparatus comprising: a plurality of pixels configured to generate a signal corresponding to a radiation dose; a signal line connected to the plurality of pixels; a readout circuit configured to read out a signal from each pixel through the signal line, and generate a value corresponding to the signal; and a control unit configured to control an operation of the readout circuit, wherein the control unit causes the readout circuit to generate a first pixel value corresponding to a signal read out from each pixel, and a first offset value of the readout circuit before starting the plurality of times of radiation imaging, and the control unit causes the readout circuit to generate a second pixel value corresponding to a signal read out from each pixel, and a second offset value of the readout circuit during the plurality of times of radiation imaging.

Further features of the present invention will become apparent from the following description of exemplary embodiments (with reference to the attached drawings).

DESCRIPTION OF THE EMBODIMENTS

Embodiments of the present invention will now be described by referring to the accompanying drawings. The same reference numerals denote the same parts throughout various embodiments, and a repetitive description thereof will be omitted. The embodiments can be appropriately changed and combined. An embodiment to be described below is directed to a radiation imaging apparatus and a radiation imaging system. The radiation imaging apparatus and the radiation imaging system are used in, for example, static image capturing such as radiography, and moving image capturing such as fluoroscopy in medical diagnosis. A plurality of times of radiation imaging include a plurality of times of static image capturing, and moving image capturing such as fluoroscopy. The radiation includes $\alpha$-rays, $\beta$-rays, and $\gamma$-rays, which are beams generated by particles (including photons) emitted by radioactive decay, and also includes a beam having the same or larger energy, such as X-rays, particle beam, and cosmic rays.

Figure 1:
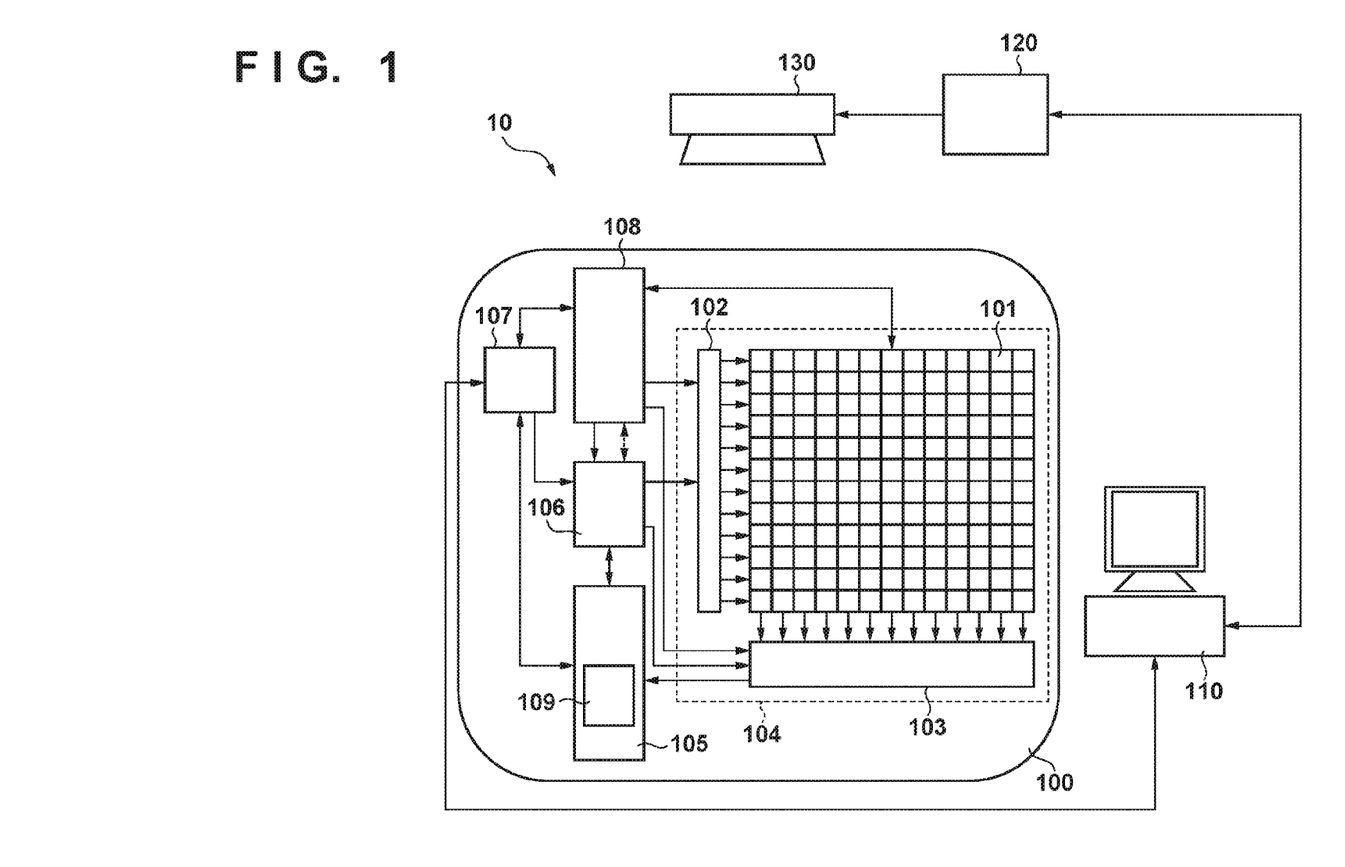
FIG. 1 is a block diagram for explaining an example of the arrangement of a radiation imaging system according to one embodiment of the present invention.

An example of the arrangement of a radiation imaging system 10 according to one embodiment will be explained with reference to the block diagram of FIG. 1. The radiation imaging system 10 includes a radiation imaging apparatus 100, a control computer 110, a radiation control apparatus 120, and a radiation generation apparatus 130. The radiation generation apparatus 130 generates radiation in accordance with a control signal from the radiation control apparatus 120, and emits the radiation for exposure toward the radiation imaging apparatus 100. The radiation imaging apparatus 100 generates an image corresponding to the irradiated radiation dose, and transmits it to the control computer 110. The control computer 110 controls the overall operation of the radiation imaging system 10. For example, the control computer 110 establishes synchronization between the radiation control apparatus 120 and the radiation imaging apparatus 100 by instructing the radiation control apparatus 120 to start/stop radiation exposure, and notifying the radiation imaging apparatus 100 of the start/stop of radiation exposure. The control computer 110 may be used to change the settings of the radiation imaging apparatus 100 by a user.

The radiation imaging apparatus 100 includes a detector 104, a signal processing unit 105, a control unit 106, a communication unit 107, and a power supply unit 108. The detector 104 detects radiation and generates an electrical signal corresponding to the detected radiation dose. The detector 104 is sometimes called a flat panel detector (FPD). The detector 104 includes a pixel array 101, a driving circuit 102, and a readout circuit 103. In the pixel array 101, a plurality of pixels that generate an electrical signal corresponding to a radiation dose are arrayed in a two-dimensional matrix. The driving circuit 102 drives each pixel included in the pixel array 101 and causes it to output an electrical signal. The readout circuit 103 reads out an electrical signal from the pixel array 101 and outputs a value corresponding to the electrical signal.

The control unit 106 controls the overall operation of the radiation imaging apparatus 100. The communication unit 107 communicates with another apparatus, for example, the control computer 110. The power supply unit 108 generates power to be supplied to each component of the radiation imaging apparatus 100. The signal processing unit 105 generates a radiation image by using a value acquired from the detector 104. The signal processing unit 105 includes a memory 109 for storing a radiation image and the like. Although the radiation imaging apparatus 100 includes the signal processing unit 105 in the embodiment of FIG. 1, the control computer may include the signal processing unit 105 instead in another embodiment.

Figure 2:
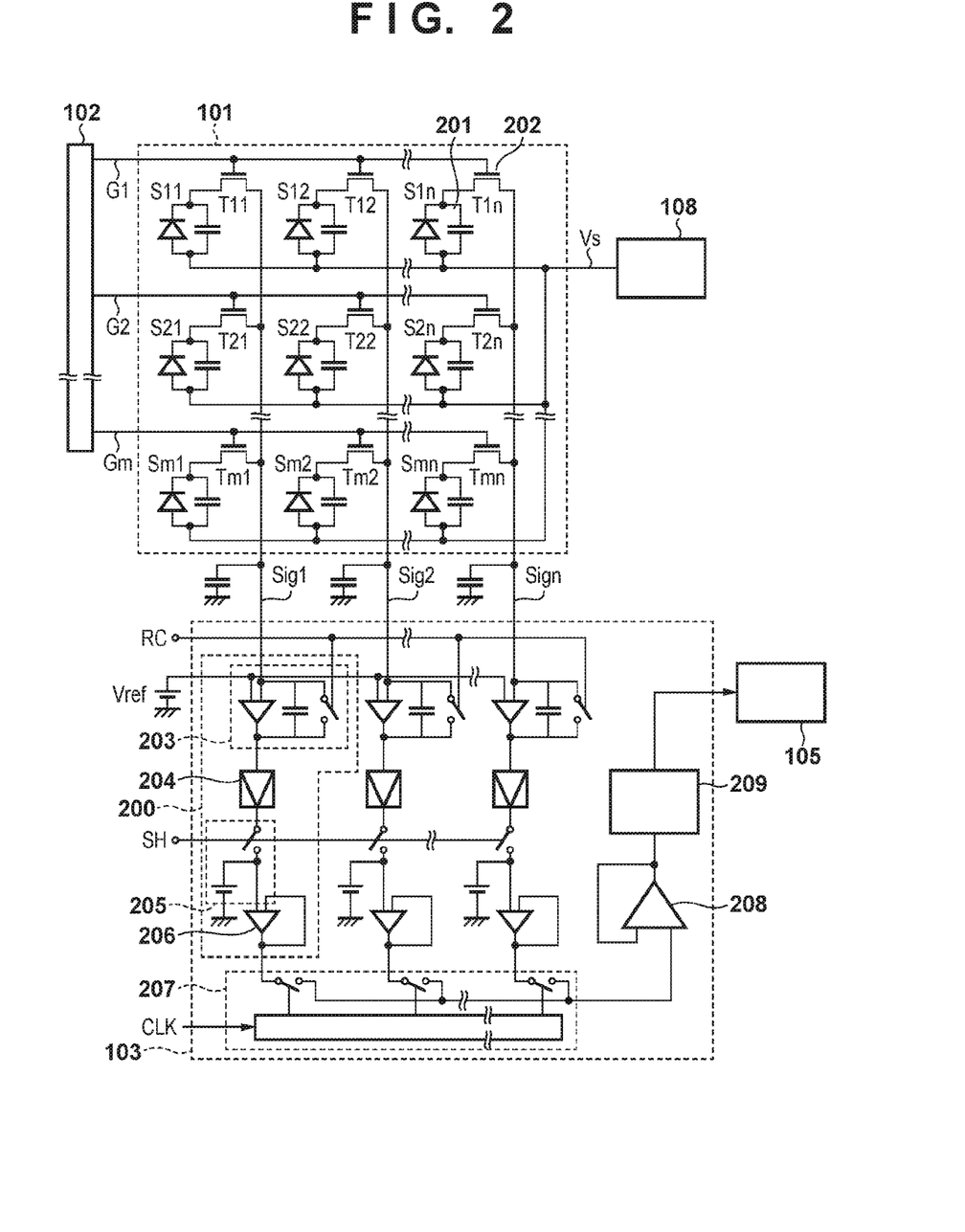
FIG. 2 is an equivalent circuit diagram for explaining an example of the arrangement of part of the radiation imaging system in FIG. 1.

An example of the arrangement of the detector 104 will be explained with reference to the equivalent circuit diagram of FIG. 2. The pixel array 101 of the detector 104 includes pixels arranged in m rows×n columns (m and n are integers of 1 or more). For example, when the radiation imaging apparatus 100 is 17 inches large, the pixel array 101 includes pixels arranged in about 2,800 rows×2,800 columns. In FIG. 2, attention is paid to pixels arranged in 3 rows×3 columns to simplify the description.

Each pixel included in the pixel array 101 includes a conversion element 201 that converts radiation or light into charges, and a switching element 202 that outputs an electrical signal corresponding to the charges. The conversion element 201 functions as an element (sensor) that detects radiation. In FIG. 2, Sij and Tij represent the conversion element 201 and switching element 202 respectively included in a pixel positioned on the ith row and the jth column (i and j are integers satisfying $1 \leq i \leq m$ and $1 \leq j \leq n$). The conversion element 201 may be a photoelectric conversion element that converts visible light into charges, or a conversion element that converts radiation directly into charges. When the conversion element 201 is a photoelectric conversion element, a scintillator that converts radiation into visible light is arranged on the radiation incident side of the detector 104. The conversion element 201 may be a MIS photodiode that is arranged on an insulating substrate such as a glass substrate and is mainly made of amorphous silicon, or a PIN photodiode. The switching element 202 is, for example, a transistor having a control terminal and two main terminals. This embodiment uses a thin film transistor (TFT) as the switching element 202. One electrode of the conversion element 201 is electrically connected to one of the two main terminals of the switching element 202, and the other electrode is electrically connected to the power supply unit 108 via a bias line Vs. All pixels included in the pixel array 101 are commonly connected to the bias line Vs. A bias voltage is supplied from the power supply unit 108 to the conversion element 201 of each pixel through the bias line Vs.

The detector 104 further includes m driving lines G1 to Gm (to be generically referred to as driving lines G hereinafter). The control terminals of the switching elements 202 of a plurality of pixels constituting a row are commonly connected to each driving line G. One end of each driving line G is connected to the driving circuit 102. The driving circuit 102 causes each pixel to output an electrical signal by supplying, to pixels of each row in the pixel array 101 through the driving line G in accordance with a control signal supplied from the control unit 106, a driving signal for controlling the conductive state of the switching element 202.

The detector 104 further includes n signal lines Sig1 to Sign (to be generically referred to as signal lines Sig hereinafter). The other-side main terminals (main terminals not connected to the conversion elements 201) of the switching elements 202 of a plurality of pixels constituting a column are commonly connected to each signal line Sig. One end of each signal line Sig is connected to the readout circuit 103. While the switching element 202 is in the conductive state, an electrical signal corresponding to charges accumulated in the conversion element 201 is supplied to the signal line Sig, and the readout circuit 103 reads out this electrical signal. A plurality of electrical signals supplied to the respective signal lines Sig from a plurality of pixels constituting one row are supplied in parallel to the readout circuit 103.

The readout circuit 103 includes a plurality of amplifier circuits 200, a multiplexer 207, a buffer amplifier 208, and an A/D converter 209. The readout circuit 103 reads out an electrical signal supplied to the signal line Sig, generates a value corresponding to this electrical signal, and supplies the value to the signal processing unit 105. The series of operations performed by the readout circuit 103 will be called a readout operation. The amplifier circuits 200 are individually arranged for the respective signal lines Sig. Each amplifier circuit 200 amplifies and outputs an electrical signal supplied from the signal line Sig. The multiplexer 207 sequentially outputs electrical signals output in parallel from the amplifier circuits 200 in response to a control signal CLK supplied from the control unit 106. The buffer amplifier 208 converts the impedance of an electrical signal output from the multiplexer 207, and outputs the converted electrical signal. The A/D converter 209 converts analog data output from the buffer amplifier 208 into digital data, and supplies the digital data to the signal processing unit 105.

Each amplifier circuit 200 includes an integrating amplifier 203, a variable amplifier 204, a sample and hold circuit 205, and a buffer amplifier 206. The integrating amplifier 203 includes an operational amplifier, an integrating capacitor, and a reset switch. The integrating amplifier 203 integrates, amplifies, and outputs an electrical signal supplied from the signal line Sig. An output from the operational amplifier is fed back to the inverting input terminal of the operational amplifier through the integrating capacitor, and a reference voltage Vref is supplied from the power supply unit 108 to the non-inverting input terminal. By changing the value of the integrating capacitor, the amplification factor of the amplifier circuit 200 can be changed. When the reset switch of the integrating amplifier 203 is turned on in accordance with a control signal RC supplied from the control unit 106, the integrating amplifier 203 is reset. The variable amplifier 204 amplifies and outputs an electrical signal supplied from the integrating amplifier 203.

The sample and hold circuit 205 includes a sampling switch and a sampling capacitor, and samples and holds an electrical signal supplied from the variable amplifier 204 in accordance with a control signal SH supplied from the control unit 106. The electrical signal held by the sample and hold circuit 205 is output from the amplifier circuit 200 through the buffer amplifier 206.

Figure 3:
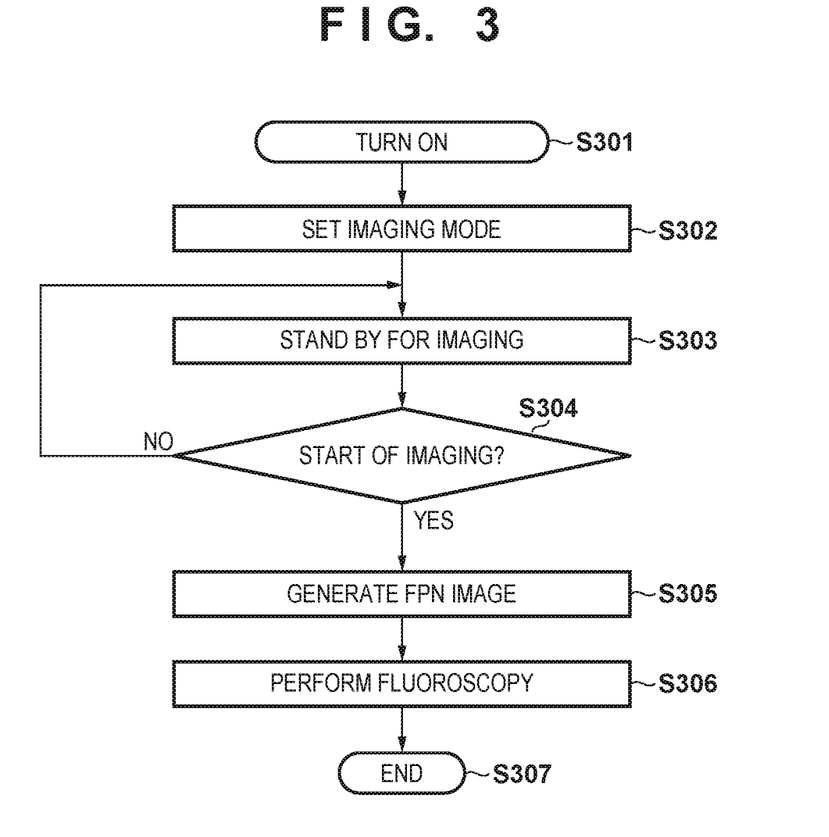
FIG. 3 is a flowchart for explaining an example of the operation of the radiation imaging system in FIG. 1.

An example of the operation of the radiation imaging system 10 will be explained with reference to the flowchart of FIG. 3. When the radiation imaging system 10 is turned on in step S301, the operation of the radiation imaging system 10 starts. In step S302, the control computer 110 sets the imaging mode of the radiation imaging system 10 based on an input from the user of the radiation imaging system 10. The imaging mode includes, for example, a radiography mode in which a static image is captured, and a fluoroscopy mode in which a moving image is captured. For example, in accordance with the imaging mode, the control computer 110 sets the intensity of exposure radiation from the radiation generation apparatus 130, and sets the sensitivity of the radiation imaging apparatus 100 (for example, the gain of the amplifier of the readout circuit 103). A case in which the radiation imaging system 10 is set in the fluoroscopy mode will be explained below. When the radiation imaging system 10 is set in the radiography mode, an existing method may be applied.

In step S303, the radiation imaging system 10 changes to an imaging standby state in which the radiation imaging system 10 stands by for an imaging start instruction from the user. The radiation imaging apparatus 100 in the imaging standby state reads out an electrical signal from the pixels in order to remove charges generated by a dark current. In step S304, the control computer 110 determines whether the user has input an imaging start instruction. The imaging start instruction is input by pressing, for example, a radiation exposure switch. If no imaging start instruction has been input (NO in step S304), the radiation imaging system 10 maintains the imaging standby state. If the imaging start instruction has been input (YES in step S304), the radiation imaging apparatus 100 generates an FPN image in step S305. The FPN image is an image that is generated by the radiation imaging apparatus 100 by reading out an electrical signal from the pixel array 101 in a state in which the radiation imaging apparatus 100 is not irradiated with radiation. During the operation in step S305, the radiation generation apparatus 130 does not start radiation exposure yet. The radiation imaging apparatus 100 may generate only one FPN image or generate a plurality of FPN images. The number of FPN images generated by the radiation imaging apparatus 100 may be set at, for example, the time of manufacturing the radiation imaging apparatus 100 or by the user through the control computer 110.

After the end of generating a predetermined number of FPN images by the radiation imaging apparatus 100, the radiation imaging system 10 starts fluoroscopy in step S306. During fluoroscopy (during radiation imaging), the radiation generation apparatus 130 intermittently performs radiation exposure, and the radiation imaging apparatus 100 generates an image corresponding to the irradiated radiation dose, that is, a radiation image. The synchronization between the radiation generation apparatus 130 and the radiation imaging apparatus 100 is established by, for example, the control computer 110.

After the end of fluoroscopy, the operation of the radiation imaging system 10 ends in step S307. More specifically, the radiation generation apparatus 130 ends the radiation exposure, and the radiation imaging apparatus 100 ends the generation of the image. Fluoroscopy may be ended when a predetermined time has elapsed, ended when the remaining capacity of a storage device that stores a fluoroscopic image becomes smaller than a threshold, or ended in accordance with a user instruction.

Figure 4:
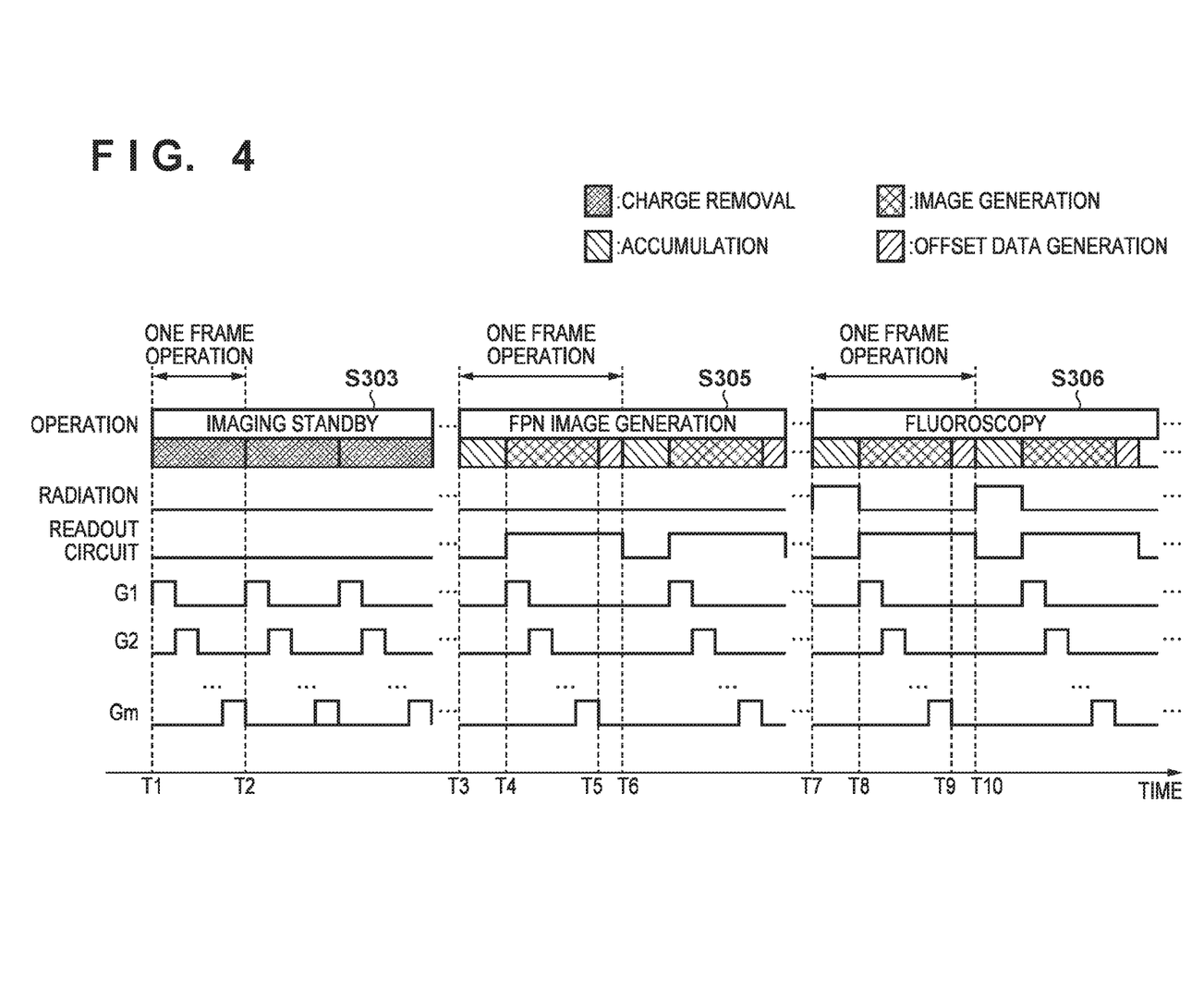
FIG. 4 is a timing chart for explaining an example of the operation of the radiation imaging system in FIG. 1.

Details of the operation of the radiation imaging apparatus 100 in steps S303, S305, and S306 of FIG. 3 will be explained with reference to the timing chart of FIG. 4. In FIG. 4, a line "operation" indicates the contents of the operation of the radiation imaging apparatus 100. A line "radiation" indicates whether the radiation imaging apparatus 100 is irradiated with radiation. The radiation imaging apparatus 100 is irradiated with radiation during high level, and is not irradiated with radiation during low level. A line "readout circuit" indicates whether the readout circuit 103 performs the readout operation. The readout circuit 103 performs the readout operation during high level, and does not perform it during low level. While the readout circuit 103 does not perform the readout operation, the control unit 106 may stop supply of power from the power supply unit 108 to the readout circuit 103 in order to reduce the power consumption. Lines "G1" to "Gm" indicate the levels of driving signals respectively supplied from the driving circuit 102 to the driving lines G1 to Gm. The switching element 202 is in the conductive state during high level, and is in the non-conductive state during low level.

When the operation in step S303 starts at time T1, that is, when the radiation imaging apparatus 100 changes to the imaging standby state, the control unit 106 controls the driving circuit 102 to temporarily switch driving signals to be supplied to the respective driving lines G to high level sequentially from the driving line G1 to the driving line Gm. In response to this, the switching elements 202 change to the conductive state, and charges generated by a dark current are removed from the conversion elements 201. The switching of the driving signal ends up to the driving line Gm at time T2, and the control unit 106 repeats the same processing sequentially from the driving line G1. The series of operations from time T1 to time T2 will be called one frame operation during imaging standby. In the imaging standby state, the radiation imaging apparatus 100 is not irradiated with radiation. Since no signal need be read out from the pixel array 101 in the imaging standby state, the control unit 106 does not cause the readout circuit 103 to perform the readout operation.

When the operation in step S305 starts at time T3, that is, when the radiation imaging system 10 is instructed to start imaging, the radiation imaging apparatus 100 starts generation of an FPN image. The FPN image is constituted by m×n pixel values. The pixel value is a value generated by performing the readout operation by the readout circuit 103 in a state in which an electrical signal is supplied from the pixel to the signal line Sig.

First, during the interval between time T3 and time T4, the control unit 106 maintains, at low level, all driving signals supplied from the driving circuit 102 to the driving lines G1 to Gm. Hence, charges generated by the dark current are accumulated in the conversion elements 201 of the respective pixels. The time (accumulation time) between time T3 and time T4 is a value set in advance, and has the same duration as that of the accumulation time at the time of fluoroscopy (to be described later) (step S306). After the lapse of the accumulation time, the driving circuit 102 temporarily switches driving signals to be supplied to the respective driving lines G to high level sequentially from the driving line G1 during the interval between time T4 and time T5, changing the switching elements 202 to the conductive state. Accordingly, electrical signals corresponding to charges accumulated in the conversion elements 201 of the respective rows are sequentially supplied to the signal lines Sig. During the interval between time T4 and time T5, the control unit 106 causes the readout circuit 103 to perform the readout operation. Pixel values corresponding to the signals supplied from the respective pixels to the signal lines Sig are generated and supplied to the signal processing unit 105. The signal processing unit 105 stores m×n pixel values supplied from the readout circuit 103 as an FPN image in the memory 109.

The switching of the driving signal ends up to the driving line Gm at time T5, and the control unit 106 causes the readout circuit 103 to generate an offset value. The offset value is a value generated by performing the readout operation by the readout circuit 103 in a state in which an electrical signal from the pixel is not supplied to the signal line Sig. The offset value is generated for every n amplifier circuits 200. To generate an offset value, the readout circuit 103 performs the same readout operation as that performed when generating a pixel value. The readout circuit 103 supplies n generated offset values to the signal processing unit 105. The signal processing unit 105 stores the n offset values together as offset data in the memory 109. The offset data generated during the FPN image generation operation in step S305 will be called FPN offset data.

The generation of the offset data ends at time T6, and the control unit 106 repeats the operations from time T3 to time T6 to generate a preset number of FPN images and offset data corresponding to them. The series of operations from time T3 to time T6 will be called one frame operation in FPN image generation. During the FPN image generation operation in step S305, the radiation imaging apparatus 100 is not irradiated with radiation. Also, during charge accumulation (between time T3 and time T4), the control unit 106 does not cause the readout circuit 103 to perform the readout operation.

When the operation in step S306 starts at time T7, that is, when the radiation imaging system 10 starts fluoroscopy, the radiation imaging apparatus 100 starts generation of a radiation image. The radiation image is constituted by m×n pixel values. The operation performed by the radiation imaging apparatus 100 from time T7 to time T10 is the same as the operation performed by the radiation imaging apparatus 100 from time T3 to time T6. A repetitive description will therefore be omitted. The series of operations from time T7 to time T10 will be called one frame operation in fluoroscopy. One frame of a fluoroscopic image (moving image) is generated by one frame operation. The radiation imaging apparatus 100 is irradiated with radiation during the interval between time T7 and time T8. At time T8, not only charges generated by the dark current but also charges generated in accordance with the radiation are accumulated in the conversion elements 201 of the respective pixels. The readout circuit 103 supplies m×n pixel values generated during the interval between time T8 and time T9 to the signal processing unit 105. The signal processing unit 105 stores these pixel values as a radiation image in the memory 109.

The switching of the driving signal ends up to the driving line Gm at time T9, and the control unit 106 causes the readout circuit 103 to generate n offset values. The readout circuit 103 supplies the n generated offset values to the signal processing unit 105. The signal processing unit 105 stores the n offset values together as offset data in the memory 109. The offset data generated during fluoroscopy in step S306 will be called fluoroscopic offset data.

The generation of the offset data ends at time T10, and the control unit 106 repeats the operations from time T7 to time T10 until fluoroscopy ends.

By the above-described operation, the signal processing unit 105 generates a predetermined number of FPN images, FPN offset data corresponding to them, a radiation image, and fluoroscopic offset data. The signal processing unit 105 corrects the radiation image by using the predetermined number of FPN images, the FPN offset data corresponding to them, and the fluoroscopic offset data. That is, the signal processing unit 105 functions as a correction unit that corrects a radiation image.

First, the signal processing unit 105 generates a correction FPN image by using an obtained FPN image. The correction FPN image is an FPN image used to correct a radiation image. When only one FPN image is generated, the signal processing unit 105 uses this FPN image as a correction FPN image without any change. When a plurality of FPN images are generated, the signal processing unit 105 generates one correction FPN image from these FPN images. For example, the signal processing unit 105 generates a correction FPN image by averaging the pixel values of pixels present at the same position in the plurality of FPN images. The correction FPN image is also constituted by m×n pixel values. In the following description, FI represents a correction FPN image, and FI(i, j) represents a pixel value on the ith row and the jth column in the correction FPN image FI.

Also, the signal processing unit 105 generates correction FPN offset data by using obtained FPN offset data. The correction FPN offset data is FPN offset data used to correct a radiation image. When only one FPN offset data is generated, the signal processing unit 105 uses this FPN offset data as correction FPN offset data without any change. When a plurality of FPN offset data are generated, the signal processing unit 105 generates one correction FPN offset data from these FPN offset data. For example, the signal processing unit 105 generates correction FPN offset data by averaging offset values present at the same position in the plurality of FPN offset data. The correction FPN offset data also includes n offset values. In the following description, FO represents correction FPN offset data, and FO(j) represents an offset value on the jth column in the correction FPN offset data FO.

A plurality of FPN images are averaged to create one correction FPN image, thereby multiplying random noise by $1/\sqrt{2}$ times and increasing the S/N ratio of an image having undergone correction using the FPN image. This also applies to FPN offset data. In this embodiment, the signal processing unit 105 generates a correction FPN image and correction FPN offset data until the first offset data during fluoroscopy is generated.

The signal processing unit 105 corrects a radiation image generated by each frame operation during fluoroscopy by using the above-mentioned correction FPN image FI and correction FPN offset data FO, and fluoroscopic offset data. XI(t) represents a radiation image generated by the t-th frame operation, and XI(t, i, j) represents a pixel value on the ith row and the jth column in the radiation image XI(t). In addition, XO(t) represents fluoroscopic offset data generated by the t-th frame operation, and XO(t, j) represents an offset value on the jth column in the fluoroscopic offset data XO(t). Further, XI'(t) represents a radiation image obtained by correcting the radiation image XI(t), and XI'(t, i, j) represents a pixel value on the ith row and the jth column in the radiation image XI'(t). At this time, the signal processing unit 105 generates a radiation image XI' according to the following equation:

$$XI'(t,i,j)=XI(t,i,j)-XO(t,j)-\{FI(i,j)-FO(j)\} \quad (1)$$

(where $1 \leq i \leq m$, $1 \leq j \leq n$, $1 \leq t$)

That is, the signal processing unit 105 calculates the pixel value of a radiation image after correction by subtracting a fluoroscopic offset value and the pixel value of an FPN image from the pixel value of the radiation image, and adding an FPN offset value. The radiation imaging apparatus 100 transmits the radiation image XI' obtained by this correction to the control computer 110.

Figure 5:
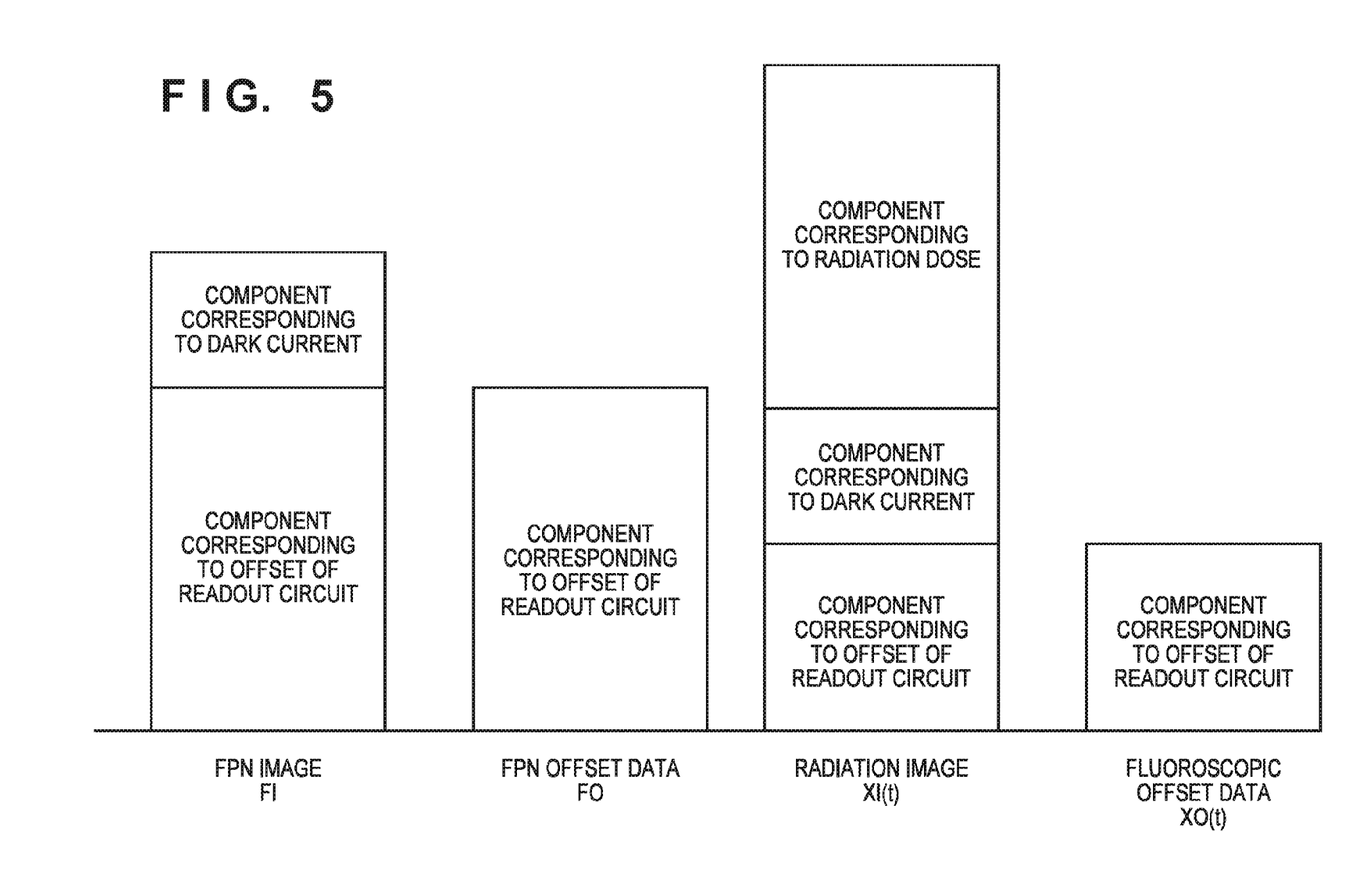
FIG. 5 is a view for explaining the principle of FPN correction by the radiation imaging system in FIG. 1.

The effect of correcting a radiation image by the signal processing unit 105 according to equation (1) will be explained with reference to FIG. 5. In the following description, a correction FPN image and correction FPN offset data will be simply referred to as an FPN image and FPN offset data. As shown in FIG. 5, the FPN image FI contains a component corresponding to a dark current generated in the pixels, and a component corresponding to the offset of the readout circuit 103. The FPN offset data FO contains only a component corresponding to the offset of the readout circuit 103. The radiation image XI(t) contains a component corresponding to the dose of radiation with which the radiation imaging apparatus 100 is irradiated, a component corresponding to a dark current generated in the pixels, and a component corresponding to the offset of the readout circuit 103. The fluoroscopic offset data XO(t) contains only a component corresponding to the offset of the readout circuit 103.

To increase the frame rate, the radiation imaging apparatus 100 according to this embodiment generates the FPN image FI before fluoroscopy without generating an FPN image during fluoroscopy. Thus, the radiation image XI(t) and the FPN image FI are generated at different times. The present inventors have found that, when a temperature in the radiation imaging apparatus 100 at the time of generating the radiation image XI(t) is different from a temperature in the radiation imaging apparatus 100 at the time of generating the FPN image FI, offset components contained in these two images have different values, as shown in FIG. 5. For this reason, only a component corresponding to a radiation dose cannot be accurately extracted by only subtracting the FPN image FI from the radiation image XI(t).

Hence, the radiation imaging apparatus 100 according to this embodiment corrects the radiation image XI(t) by using not only the FPN image FI but also the FPN offset data FO and the fluoroscopic offset data XO(t). Since the FPN image FI and the FPN offset data FO are generated temporally successively, components that are contained in these data and correspond to the offset of the readout circuit 103 become almost equal to each other. Since the radiation image XI(t) and the fluoroscopic offset data XO(t) are generated temporally successively, components that are contained in these data and correspond to the offset of the readout circuit 103 become almost equal to each other.

Therefore, the component corresponding to the offset of the readout circuit 103 can be removed from the radiation image XI(t) by subtracting the fluoroscopic offset data XO(t) from the radiation image XI(t). Also, only a component corresponding to a dark current can be extracted by subtracting the FPN offset data FO from the FPN image FI. The component corresponding to the dark current can be removed from the radiation image XI(t) by subtracting the component corresponding to the dark current from the radiation image XI(t). Note that a change arising from a temperature change of the component corresponding to the dark current is smaller than a change of the component corresponding to the offset of the readout circuit 103, and thus need not be taken into account. By correcting the radiation image XI(t) in accordance with equation (1), the radiation image XI'(t) after correction containing only a component corresponding to a radiation dose can be correctly generated from the radiation image XI(t) regardless of a change of the temperature in the radiation imaging apparatus 100.

As represented by time T7 to time T10 in FIG. 4, the radiation imaging apparatus 100 according to this embodiment performs the accumulation operation during each frame operation, generates the radiation image XI(t), and then generates the fluoroscopic offset data XO(t). Alternatively, the radiation imaging apparatus 100 may perform the accumulation operation during each frame operation, generate the fluoroscopic offset data XO(t), and then generate the radiation image XI(t).

The advantage of generating the radiation image XI(t) and then generating the fluoroscopic offset data XO(t), as in this embodiment, will be explained below. The present inventors have found that, when the fluoroscopic offset data XO(t) is generated immediately after the end of the accumulation operation, shading is generated in the radiation image XI'(t) after correction. This is considered to arise from instability of the temperature of the readout circuit 103 at the time of generating offset data because the readout circuit 103 is switched from OFF to ON upon a shift from the accumulation operation to the offset data generation operation. That is, the temperature of the readout circuit 103 is low during the accumulation operation, and rises as the readout operation is repeated. By generating the offset data XO(t) after generating the radiation image XI(t), the radiation imaging apparatus 100 can generate the offset data XO(t) at the same temperature as that at which most rows of the radiation image XI(t) were read out. This also applies to the order of generation of an FPN image and generation of FPN offset data.

In the above-described embodiment, the signal processing unit 105 stores both the correction FPN image and correction FPN offset data. However, the signal processing unit 105 may store only data (that is, FI(i, j)−FO(j) in equation (1)) obtained by subtracting the correction FPN offset data from the correction FPN image. In the above-described embodiment, the signal processing unit 105 generates a correction FPN image from a predetermined number of FPN images, and generates correction FPN offset data from a predetermined number of FPN offset data. Instead, the signal processing unit 105 may calculate FI(i, j)−FO(j) in equation (1) by averaging a plurality of data obtained by subtracting FPN offset data from FPN images generated by the same frame operation.

The radiation imaging apparatus 100 generates only one fluoroscopic offset data XO(t) by each frame operation during fluoroscopy in the above-described embodiment, but may generate a plurality of (for example, 60 or more)

fluoroscopic offset data by each frame operation. By using the plurality of fluoroscopic offset data, the signal processing unit 105 generates the fluoroscopic offset data XO(t) to be used in equation (1). For example, the signal processing unit 105 generates the fluoroscopic offset data XO(t) by averaging the plurality of fluoroscopic offset data. In this manner, a plurality of fluoroscopic offset data are generated by each frame operation, the radiation image XI(t) is corrected in accordance with them, and a streaked artifact generated in the radiation image XI'(t) after correction can be reduced.

If the number of fluoroscopic offset data generated by each frame operation increases, the frame rate decreases in accordance with the increase. To reduce the artifact while suppressing the decrease in frame rate, not only the fluoroscopic offset data XO(t) but also fluoroscopic offset data XO(t−1) may be used for correction of the radiation image XI(t). That is, the signal processing unit 105 may correct a radiation image by further using fluoroscopic offset data generated by a frame operation immediately preceding a frame operation in which the correction target radiation image was generated. For example, the signal processing unit 105 generates a radiation image XI' according to the following equation:

$$XI'(t,i,j)=XI(t,i,j)-\{XO(t,j)+XO(t-1,j)\}/2-\{FI(i,j)-FO(j)\} \quad (2)$$

(where $1 \leq i \leq m$, $1 \leq j \leq n$, $2 \leq t$)

In equation (2), the fluoroscopic offset data XO(t−1, j) may be fluoroscopic offset data generated by one readout operation, or may be generated based on a plurality of fluoroscopic offset data generated by performing the readout operation a plurality of times. In general, the signal processing unit 105 may correct a radiation image by further using fluoroscopic offset data generated by an arbitrary frame operation preceding a frame operation in which the correction target radiation image was generated.

Figure 6:
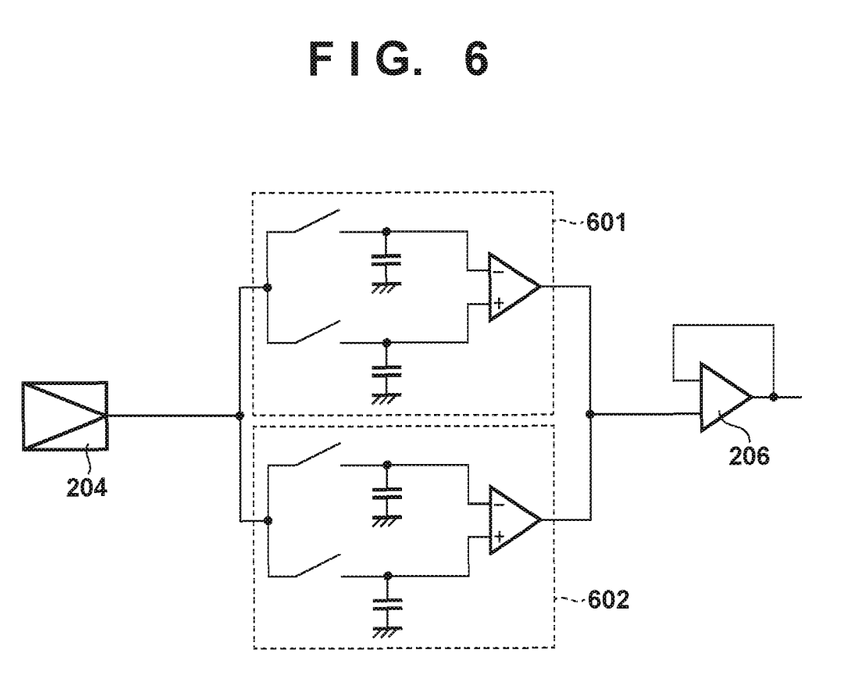
FIG. 6 is an equivalent circuit diagram for explaining a modification of the radiation imaging system in FIG. 1.

A modification of the radiation imaging apparatus 100 will be explained with reference to FIG. 6. In this modification, the radiation imaging apparatus 100 includes two parallel-connected correlated double sampling (CDS) circuits 601 and 602, in place of the sample and hold circuit 205. Each of the CDS circuits 601 and 602 is constituted by two sample and hold circuits and one differential amplifier. The readout circuit 103 reads out signals from the pixel array 101 by alternately using a readout path using the CDS circuit 601 and a readout path using the CDS circuit 602. For example, the readout circuit 103 uses the CDS circuit 601 to read out the pixel values of pixels positioned on odd-numbered rows, and the CDS circuit 602 to read out the pixel values of pixels positioned on even-numbered rows.

Offset components contained in output signals differ from each other owing to the difference in sample and hold capacitor between a case in which the readout circuit 103 uses the CDS circuit 601 and a case in which the readout circuit 103 uses the CDS circuit 602. Thus, the radiation imaging apparatus 100 acquires FPN offset data and fluoroscopic offset data separately for the readout path using the CDS circuit 601 and the readout path using the CDS circuit 602. The radiation imaging apparatus 100 corrects the pixel values of pixels positioned on odd-numbered rows by using the FPN offset data and fluoroscopic offset data generated for the CDS circuit 601 used to read out these pixel values, and the pixel values of pixels of the FPN image at the same positions as the pixels positioned on odd-numbered rows. In addition, the radiation imaging apparatus 100 corrects the pixel values of pixels positioned on even-numbered rows by using the FPN offset data and fluoroscopic offset data generated for the CDS circuit 602 used to read out these pixel values, and the pixel values of pixels of the FPN image at the same positions as the pixels positioned on even-numbered rows. The readout circuit 103 has two readout paths in this example, but may have two or more readout paths. The signal processing unit 105 corrects a radiation image by using FPN offset data and fluoroscopic offset data generated separately for the respective readout paths.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-259269, filed Dec. 22, 2014, which is hereby incorporated by reference herein in its entirety.

What is claimed is:

1. A radiation imaging system for performing a plurality of times of radiation imaging, the system comprising:
a plurality of pixels configured to generate a signal corresponding to a radiation dose;
a signal line to which signals are supplied from one or more pixels of the plurality of pixels;
a readout circuit configured to perform a readout operation, the readout operation including reading out a signal (if any) that is being supplied to the signal line and generating a value corresponding to the signal;
a control unit configured to control the readout operation; and
a correction unit configured to correct the value generated by the readout circuit, wherein
the control unit causes the readout circuit to generate two values, including a first pixel value by performing the readout operation while a signal is being supplied from the one or more pixels to the signal line, and including a first offset value by performing the readout operation while no signal is being supplied from the one or more pixels to the signal line, before starting the plurality of times of radiation imaging, the control unit causes the readout circuit to generate two further values, including a second pixel value by performing the readout operation while a signal is being supplied from the one or more pixels to the signal line, and including a second offset value by performing the readout operation while no signal is being supplied from the one or more pixels to the signal line, during the plurality of times of radiation imaging, and the correction unit corrects the second pixel value by using the first pixel value, the first offset value, and the second offset value.

2. The system according to claim 1, wherein the plurality of pixels include conversion elements configured to generate charges corresponding to the radiation dose and a switch element configured to supply a signal corresponding to the charges to the signal line while the switch element is in a conductive state, the control unit accumulates charges in the conversion elements of the plurality of pixels while the switch elements are in a non-conductive state, and the control unit repetitively performs a frame operation including a first operation of accumulating the charges, a second operation of generating the second pixel value, and a third operation of generating the second offset value during the plurality of times of radiation imaging.

3. The system according to claim 2, wherein the control unit performs the first operation, the second operation, and the third operation in an order named in one frame operation.

4. The system according to claim 2, wherein the control unit does not drive the readout circuit during the first operation.

5. The system according to claim 4, further comprising a power supply unit configured to generate power to be supplied to the readout circuit, wherein the control unit controls supply of the power from the power supply unit to the readout circuit, and the control unit does not supply the power from the power supply unit to the readout circuit during the first operation.

6. The system according to claim 2, wherein the correction unit uses, as the second offset value for correcting the second pixel value, the second offset value generated by the frame operation in which the second pixel value was generated.

7. The system according to claim 6, wherein the correction unit further uses, as the second offset value for correcting the second pixel value, the second offset value generated by a frame operation immediately preceding the frame operation in which the second pixel value was generated.

8. The system according to claim 2, wherein the control unit causes the readout circuit to generate a plurality of second offset values in one frame operation, and the correction unit uses the plurality of second offset values as the second offset value for correcting the second pixel value.

9. The system according to claim 1, wherein the control unit generates a plurality of first pixel values for the respective pixels before starting the plurality of times of radiation imaging, and the correction unit uses the plurality of first pixel values as the first pixel value for correcting the second pixel value.

10. The system according to claim 1, wherein the control unit causes the readout circuit to generate a plurality of first offset values before starting the plurality of times of radiation imaging, and the correction unit uses the plurality of first offset values as the first offset value for correcting the second pixel value.

11. The system according to claim 1, wherein the readout circuit includes a plurality of readout paths, the control unit causes the readout circuit to generate the first pixel value, the second pixel value, the first offset value, and the second offset value by using the plurality of readout paths, and the correction unit corrects the second pixel value by using the first pixel value, the first offset value, and the second offset value that have been generated using a readout path used to generate the second pixel value, out of the plurality of readout paths.

12. The system according to claim 1, wherein the correction unit corrects the second pixel value by performing subtraction of the first pixel value and the second offset value, and addition of the first offset value with respect to the second pixel value.

13. A radiation imaging apparatus included in a radiation imaging system for performing a plurality of times of radiation imaging, the apparatus comprising:

a plurality of pixels configured to generate a signal corresponding to a radiation dose;

a signal line to which signals are supplied from one or more pixels of the plurality of pixels;

a readout circuit configured to perform a readout operation, the readout operation including reading out a signal (if any) that is being supplied to the signal line and generating a value corresponding to the signal; and a control unit configured to control the readout operation, wherein the control unit causes the readout circuit to generate two values, including a first pixel value by performing the readout operation while a signal is being supplied from the one or more pixels to the signal line, and including a first offset value by performing the readout operation while no signal is being supplied from the one or more pixels to the signal line, before starting the plurality of times of radiation imaging, and the control unit causes the readout circuit to generate two further values, including a second pixel value by performing the readout operation while a signal is being supplied from the one or more pixels to the signal line, and including a second offset value by performing the readout operation while no signal is being supplied from the one or more pixels to the signal line so as to use the second offset value along with the first pixel value and the first offset value for a correction of the second pixel value, during the plurality of times of radiation imaging.

* * * * *